April 21, 1970 W. H. HANSON 3,508,199
TERNARY COMPARATOR
Original Filed Sept. 30, 1965
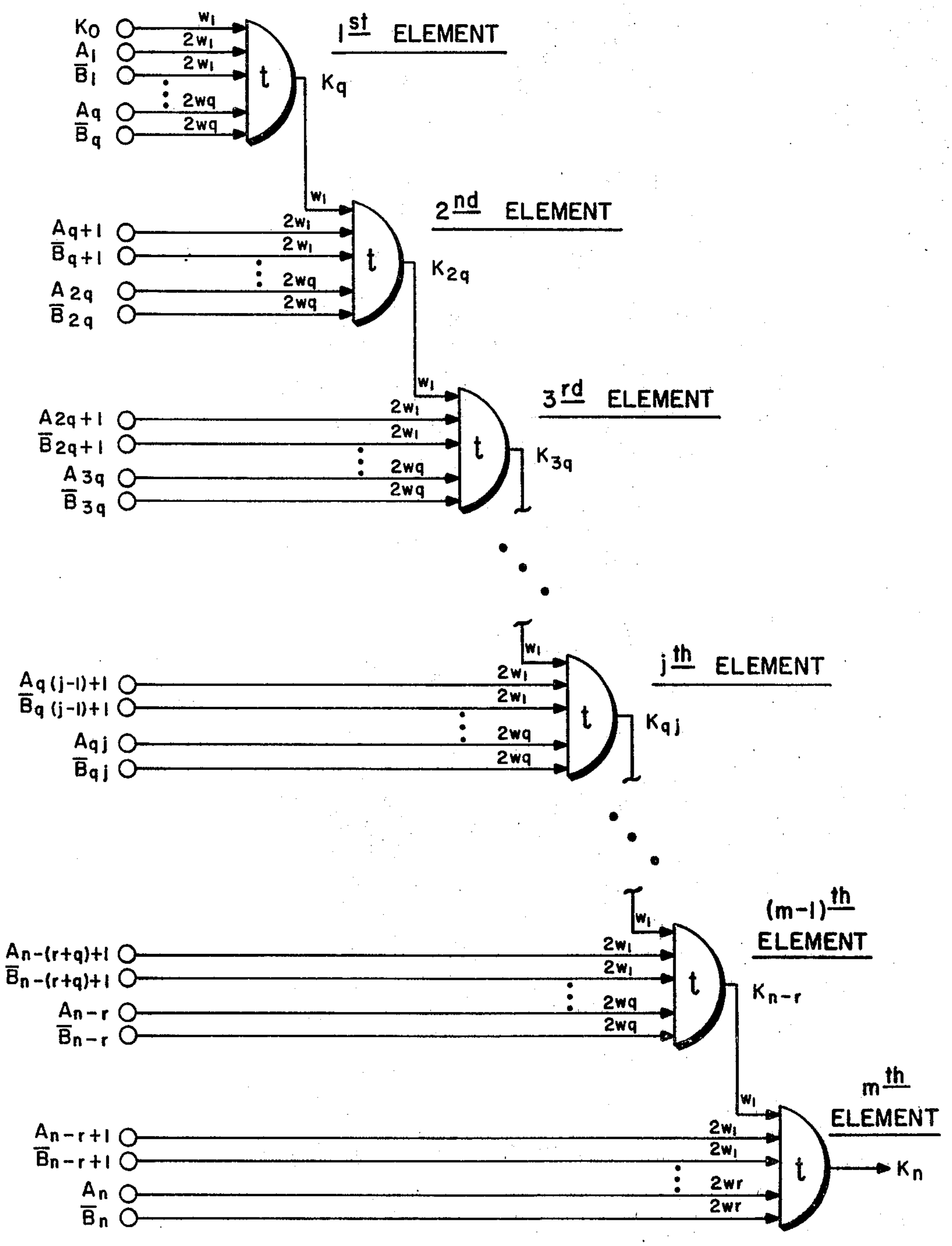
INVENTOR
*WILLIAM H. HANSON*
BY Alfred E. Hall
ATTORNEY

3,508,199
TERNARY COMPARATOR

William H. Hanson, Minneapolis, Minn., assignor to Sperry Rand Corporation, New York, N.Y., a corporation of Delaware Original application Sept. 30, 1965, Ser. No. 491,594, now Patent No. 3,346,730. Divided and this application May 5, 1967, Ser. No. 636,479
Int. Cl. G06f 7/04
U.S. Cl. 340—146.2 4 Claims

ABSTRACT OF THE DISCLOSURE

A ternary comparator utilizing multi-input ternary threshold logic elements for performing ternary arithmetical operations.

This is a divisional application of the commonly assigned copending application of W. H. Hanson, Ser. No. 491,594, filed Sept. 30, 1965 and entitled "Signed Ternary Carry Generator."

Both the conventional and signed ternary number systems, along with associated arithmetical operations, are defined and discussed in Patent No. 3,210,529 issued Oct. 5, 1965 to W. H. Hanson and assigned to the assignee of the present invention.

Conventional ternary comparator networks are generally serial in nature and consist of a serial arrangement of ternary comparator stages such as those disclosed in a paper by W. H. Hanson entitled "Ternary Threshold Logic," published in IEEE Transactions on Electronic Computers, vol EC–12, pp. 191–197, June 1963. Serial networks of this type require a relatively large number of elements and logic levels to effect. Some further properties of ternary threshold logic are discussed in a note by R. Merrill entitled "Some Properties of Ternary Threshold Logic" published in IEEE Transaction on Electronic Computers, vol. EC–13, pp. 632–635, October 1964.

It has been determined that a comparison, through the $jq^{th}$ digit-order, of two ternary words of the form $A_n \ldots A_k \ldots A_1$ and $B_n \ldots B_k \ldots B_1$ is represented by the logical function, $$K_{jq}=2w_qA_{qj}{}^t2w_q\overline{B}_{qj}{}^t \ldots {}^t2w_iA_{q(j-1)}{}^t{}_{+i}$$
$$2w_i\overline{B}_q{}^t{}_{(j-i)+i}{}^t2w_1A_{q(j-1)}{}^t{}_{+1}2w_1\overline{B}_{q(j-1)}{}^t{}_{+1}tK_{q(j-1)}$$

It is proposed by this invention to reduce the number of elements and logic levels necessary to generate signals representative of signed ternary comparisons by utilizing these determinations and their logical equivalents.

The invention is effected by employing multi-input ternary threshold logic elements. There are a variety of circuits available, capable of performing the logical threshold function, which are well known in the art (such as described by R. Schauer et al. in "Some Applications of Magnetic Film Paramatrons As Logical Devices" IRE, Transactions on Electronic Computers, vol. EC–9, pp. 315–320, September 1960) and these circuits, of themselves, do not constitute a part of this invention.

The output, Y, of a ternary threshold logic element having $n$ inputs $X_n \ldots X_k \ldots X_1$ with associated weights $w_n \ldots w_k \ldots w_1$, where $w_k \geq 1$, and threshold $t$, where $$1 \leq t \leq \sum_{k21}^{n} w_k$$

can be represented as follows:

$$Y=w_nX_n{}^t \ldots {}^tw_kX_k{}^t \ldots {}^tw_1X_1$$

The value of the ternary threshold logic function, Y is determined as follows:

In the signed ternary number system;

$$Y=+1 \text{ if } \sum_{k=1}^{n} w_kX_k \geq t$$

$$Y=-1 \text{ if } \sum_{k21}^{n} w_kX_k \geq -t$$

$Y=0$ in all other cases, where $X_k=+1$, 0, $-1$, and in the conventional ternary number system;

$$Y=2 \text{ if } \sum_{k=1}^{n} w_k(X_k-1) \geq t$$

$$Y=0 \text{ if } \sum_{k21}^{n} w_k(X_k-1) \leq -t$$

$Y=1$ in all other cases, where $X_k=2$, 1, 0.

It will thus be seen that by implementing the determinations set forth above with multi-input ternary threshodl logic elements, a comparison of two ternary words can be realized in a relatively short period of time utilizing a relatively small number of elements. The novel features which are considered characteristics of this invention are set forth with particularity in the appended claims. The invention itself, both as to its organization and method of operation, as well as additional advantages thereof, will be best understood from the following description when read in connection with the accompanying drawings, in which:

The figure is a logical block diagram of a preferred embodiment of a comparator designed in accordance with this invention.

The drawing generally shows block diagrams of a basic comparator designed in accordance with the present invention. In the figure each of the blocks represent a multi-input ternary threshold logic element. The term appearing within each of the blocks represents the threshhold of the element. The term appearing at each input to each of the elements represents the weight accorded the associated input.

With reference now to the figure, a logical block diagram of a comparator according to the present invention is shown. The comparator, for generating a signal, $K_n$, representative of a comparison of two ternary words of the form $A_n \ldots A_k \ldots A_1$ and $B_n \ldots B_k \ldots B_1$, comprises $m$ multi-input ternary threshold logic elements arranged in $m$ logic levels. The number of elements, $m$ necessary to generate $K_n$ is given by, $\langle n/q \rangle$, where:

$\langle n/q \rangle = n/q$, if the quotient is an integer,
$= n/q$ rounded up to the next higher integer, if the quotient is not an integer,
$q=p-1)/2$, and $p$ is the number of distinct input signals allowed per element.

Each of the elements, $j=1 \ldots m-1$, receives $2q$ signal representations of digit-orders $A_{qj} \ldots A_{q(j-1)+1}$ and $\overline{B}_{qj} \ldots \overline{B}_{q(j-1)+1}$, of the words to be compared, A and B, and a signal representation of $K_{q(j-1)}$, the signal generated by the next lower order element. Each of these elements generates a signale $K_{qj}$, representative of a comparison through the $qj$ digit order. The $m^{th}$ element receives $2r$ signal representations of digit-orders $A_n \ldots A_{n-r+1}$ and $\overline{B}_n \ldots \overline{B}_{n-r+1}$, of words to be compared, A and B, and a signal representation of $K_{n-r}$, the signal generated by the $(m-1)^{th}$ element, where $r$ is the non-zero remainder of $n/q$. If the remainder of $n/q$ is zero then $r=q$. The $m^{th}$ element generates a signal representative of$K_n$.

Each of the elements $j=1 \ldots m-1$ has a threshold of $t(t=1 \ldots)$ and is coupled so as to receive $2q+1$ input signals representative of digit-orders $$A_{qj} \ldots A_{q(j-1)+1}$$

$\bar{B}_{qj} \ldots \bar{B}_{q(j-1)+1}$, and $K_{q(j-1)}$, the latter being representative of the signal generated by the next lower order element. Each of said digit-order inputs is weighted by a factor $2W_i=(2t)(3^i-1)$ and $K_{q(j-1)}$ is weighted by a factor of $w_1$. The $j^{th}$ element utilizes said digit-order and comparison signals to generate a signal in accordance with the logical function:

$$K_{qj}=2w_qA_{qj}{}^t2w_q\bar{B}_{qj}{}^t \ldots {}^t2w_iA_{q(j-1)+i}{}^t2w_i\bar{B}_{q(j-1)+i}{}^t \ldots {}^t2w_1A_{q(j-1)+1}{}^t2w_1\bar{B}_{q(j-1)+1}tK_{q(j-1)}$$

where $j=1 \ldots m-1$ and for each $j$, $i=1 \ldots q$.

The $m^{th}$ element has a threshold of $t$ and is coupled so as to receive $2r+1$ input signals representative of digit-orders $A_n \ldots A_{n-r+1}$, $\bar{B}_n \ldots \bar{B}_{n-r+1}$, and $K_{n-r}$, the latter being representative of the signal generated by the $(m1)^{th}$ element. Each of said digit-order inputs is weighted by a factor $2w_i=(2t)3^{i-1}$ and $K_{n-r}$ is weighted by a factor of $w_1$. The $m^{th}$ element utilizes said digit-order and comparison signals to generate a signal in accordance with the logical function:

$$K_n=2w_rA_n{}^t2w_r\bar{B}_n{}^t \ldots {}^t2w_iA_{2(m-1)+i}{}^t2w_i\bar{B}_{2(m-1)+i}{}^t \ldots {}^t2w_1A_{n-r+1}{}^t2w_1\bar{B}_{n-r+1}{}^tK_{n-r}$$

where; $i=1 \ldots r$.

Control signal, $K_0$, an input to the first element, determines what condition $K_n$ will detect, in accordance with the following:

$K_0=1$
- $K_n=1$ implies $A \geqslant B$
- $K_n=-1$ implies $A<B$ $K_0=0$
- $K_n=1$ implies $A>B$
- $K_n=0$ implies $A=B$
- $K_n=-1$ implies $A<B$ $K_0=-1$
- $K_n=1$ implies $A>B$
- $K_n=-1$ implies $A \geqslant B$ Following are two illustrative examples of specific ternary comparators designed in accordance with this invention.

Let $p=5$, $t=1$, and $n=30$. Then $q=2$, $m=15$, $r=2$, and $2w_i=(2)(3^{i-1})$.

With these parameters given the specific comparator is defined by the following logical functions.

First Element: $K_2=6A_2{}^16\bar{B}_2{}^12A_1{}^12\bar{B}_1{}^1K_0$
Second Element: $K_4=6A_4{}^1\bar{B}_4{}^12A_3{}^12\bar{B}_3{}^1K_2$
Third Element: $K_6=6A_6{}^16\bar{B}_6{}^12A_5{}^12\bar{B}_5{}^1K_4$
Fourth Element: $K_8=6A_8{}^16B_8{}^12A_7{}^12\bar{B}_7{}^1K_6$

* * * * *

$j^{th}$ Element: $K_{2j}=6A_{2j}{}^16\bar{B}_{2j}{}^12A_{2j-1}{}^12\bar{B}_{2j-1}{}^1K_{2j-2}$

* * * * *

Fourteenth Element: $K_{28}=6A_{28}{}^16\bar{B}_{28}{}^12A_{27}{}^12\bar{B}_{27}{}^1K_{26}$
Fifteenth Element: $K_{30}=6A_{30}{}^16\bar{B}_{30}{}^12A_{29}{}^12\bar{B}_{29}{}^1K_{28}$ Let $p=7$, $t=1$, and $n=29$. Then $q=3$, $m=10$, $r=2$, and $2w_i=(2)(3^{i-1})$. With these parameters given the specific comparator is defined by the following logical functions.

First Element: $K_3=18A_3{}^118\bar{B}_3{}^16A_2{}^16\bar{B}_2{}^12A_1{}^12\bar{B}_1{}^1K_0$
Second Element: $K_6=18A_6{}^118\bar{B}_6{}^16A_5{}^16\bar{B}_5{}^12A_4{}^12\bar{B}_4{}^1K_3$

* * * * *

$j^{th}$ Element:
$K_{3j}=18A_{2j}{}^118\bar{B}_{3j}6A_{3j-1}{}^16\bar{B}_{3j-1}{}^12A_{3j-2}{}^12\bar{B}_{3j-2}{}^1K_{3(j-1)}$

* * * * *

Ninth Element:
$K_{27}=18A_{27}{}^118\bar{B}_{27}{}^16A_{26}{}^16\bar{B}_{26}{}^12A_{25}{}^12\bar{B}_{25}{}^1K_{24}$
Tenth Element: $K_{29}=6A_{29}{}^16\bar{B}_{29}{}^12A_{28}{}^12\bar{B}_{28}{}^1K_{27}$ The number of distinct input signals allowed per element, $p$ (or the total number of input signals allowed per element) is determined by the specific type of hardware utilized to implement the invention. The factor $t$, which is utilized in determining the threshold of the various elements is preferably one; however any other integral value will render the invention operative.

What is claimed is:

1. A ternary comparator for generating a signal $K_n$, representive of a comparison of two words of the form $A_n \ldots A_k \ldots A_1$ and $\bar{B}_n \ldots \bar{B}_k \ldots \bar{B}_1$, comprising:

$m$ multi-input ternary threshold logic elements for generating a signal representation $K_n$, each of said signal generating elements $j=1 \ldots M=1$, coupled to the next lower signal generating element for generating a signal representative of, $K_{qj}$, a comparison through $qj^{th}$ digit-order of $A_n \ldots A_k \ldots A_1$ and $B_n \ldots B_k \ldots B_1$, comprising:

input means for receiving signal representations of digit orders $A_{qj} \ldots A_{q(j-1)+1}$, $$\bar{B}_{qj} \ldots \bar{B}_{q(j-1)+1} \text{ and } K_{q(j-1)},$$

and a multi-input ternary threshold logic element coupled to said input means for utilizing said digit-order and comparison signals to generate $K_{qj}$ in accordance with the logical function, $$K_{qj}=2w_qA_{qj}{}^t2w_q\bar{B}_{qj}{}^t \ldots {}^t2w_1A_{q(j-1)+1}{}^t2w_1\bar{B}_{q(j-1)+1}{}^ttK_{q(j-1)}$$

said signal generating element, $j=m$ coupled to the next lower signal generating element for generating a signal representative of $K_n$, comprising:

input means for receiving signal representations of digit orders $A_n \ldots A_{q(m-1)+1}$, $$\bar{B}_n \ldots \bar{B}_{q(m-1)+1} \text{ and } K_{q(m-1)},$$

and a multi-input ternary threshold logic element coupled to said input means for utilizing said digit-order and comparison signals to generate $K_n$ in accordance with the logical function $$K_n=2w_rA_n{}^t2w_r\bar{B}_n{}^t \ldots {}^t2w_1A_{q(m-1)+1}{}^t2w_1\bar{B}_{q(m-1)+1}{}^ttK_{q(m-1)}$$

2. A comparator as defined in claim 1 in which each of said multi-input ternary threshold logic elements is a signed ternary threshold logic element, said elements being arranged such the comparison signal $K_n$ is generated in $m$ logic levels.

3. A comparator as defined in claim 2 in which $m$ is defined by the function $\langle n/q \rangle$, $q=(p-1)/2$, $p$ is the number of distinct input signals per threshold element, and $r$ is the non-zero remainder of $n/q$.

4. A signal generating element for generating a signal $K_{qj}$, representative of a comparison through the $qj^{th}$ digit-order of two ternary words of the form $A_n \ldots A_k \ldots A_1$, and $\bar{B}_n \ldots \bar{B}_k \ldots \bar{B}_1$, comprising:

input means for receiving signal representations of digit-orders $A_{qj} \ldots A_{q(j-1)}$, $\bar{B}_{qj} \ldots \bar{B}_{q(j-1)+1}$ and comparison signal $K_{q(j-1)}$, the latter being representative of the comparison signal generated by a next lower element, and a multi-input ternary threshold logic element coupled to said input means for utilizing said digit-order and comparison signals to generate a signal representative of $K_{qj}$ in accordance with the logical function, $$K_{qj}=2w_qA_{qj}{}^t2w_q\bar{B}_{qj}{}^t \ldots {}^t2w_1A_{q(j-1)+1}{}^t2w_1\bar{B}_{q(j-1)+1}{}^ttK_{q(j-1)}$$

References Cited

UNITED STATES PATENTS

| | | | |
|---|---|---|---|
| 3,297,987 | 1/1967 | Bailey | 340—146.2 |
| 3,305,831 | 2/1967 | Nelson | 340—146.2 |

EUGENE G. BOTZ, Primary Examiner

R. S. DILDINE, Jr., Assistant Examiner

UNITED STATES PATENT OFFICE

CERTIFICATE OF CORRECTION

Patent No. 3,508,199 April 21, 1970

William H. Hanson

It is certified that error appears in the above identified patent and that said Letters Patent are hereby corrected as shown below:

Column 4, line 13, "...M=1" should read -- ...$\bar{M}$-1 --; line 57, after "orders" insert -- $A_{qj} \cdots A_{q(j-1)+1}, \bar{B}_{qj} \cdots \bar{B}_{q(j-1)+1}$ --.

Signed and sealed this 22nd day of December 1970.

(SEAL)
Attest:

Edward M. Fletcher, Jr.
Attesting Officer

WILLIAM E. SCHUYLER, JR.
Commissioner of Patents